(12) United States Patent
Yamamoto et al.

(10) Patent No.: US 10,447,118 B2
(45) Date of Patent: Oct. 15, 2019

(54) MOTOR APPARATUS

(71) Applicant: MABUCHI MOTOR CO., LTD., Chiba (JP)

(72) Inventors: Kazuyuki Yamamoto, Chiba (JP); Satoshi Kikuchi, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 239 days.

(21) Appl. No.: 15/549,112

(22) PCT Filed: Jan. 26, 2016

(86) PCT No.: PCT/JP2016/052169
§ 371 (c)(1),
(2) Date: Aug. 4, 2017

(87) PCT Pub. No.: WO2016/136362
PCT Pub. Date: Sep. 1, 2016

(65) Prior Publication Data
US 2018/0026497 A1 Jan. 25, 2018

(30) Foreign Application Priority Data
Feb. 25, 2015 (JP) ................... 2015-035271

(51) Int. Cl.
*H02K 11/00* (2016.01)
*H02K 11/21* (2016.01)
(Continued)

(52) U.S. Cl.
CPC ......... *H02K 11/215* (2016.01); *H02K 5/225* (2013.01); *H02K 7/1166* (2013.01); *H02K 2211/03* (2013.01); *H02K 2213/03* (2013.01)

(58) Field of Classification Search
CPC ............ H02K 5/00; H02K 5/22; H02K 5/225; H02K 7/00; H02K 7/11; H02K 7/116;
(Continued)

(56) References Cited

U.S. PATENT DOCUMENTS 4,973,271 A * 11/1990 Ishizuka ............ H01R 13/193
439/833
5,287,028 A * 2/1994 Suzuki ................ H02K 5/225
310/40 MM
(Continued)

FOREIGN PATENT DOCUMENTS

JP 63235812 * 9/1988 ............ H02K 11/00
JP 02199780 8/1990
(Continued)

OTHER PUBLICATIONS

Written Opinion of the International Searching Authority, for PCT Patent Application No. PCT/JP2016/052169, dated Apr. 19, 2016, 9 pages.
(Continued)

*Primary Examiner* — Tran N Nguyen
(74) *Attorney, Agent, or Firm* — Kinney & Lange, P.A.

(57) ABSTRACT

A motor apparatus includes a sensor magnet configured to rotate integrally with a drive shaft of a motor; a housing including a sensor housing section in which the sensor magnet is located; a pulse output board including a magnetically permeable base and a rotation detection element mounted on a mounting surface of the base and adapted to detect rotation of the sensor magnet and output a pulse; and a terminal electrically connected with the pulse output board, wherein the terminal includes an insertion slot into which the pulse output board is inserted, and the insertion slot opens to the sensor housing section, and when the pulse output board is inserted, the insertion slot supports the pulse output board in a neighborhood of the sensor magnet with a reverse surface on a side opposite the mounting surface of the base facing the sensor magnet and electrically connects the pulse output board.

7 Claims, 5 Drawing Sheets

(51) Int. Cl.
*H02K 11/215* (2016.01)
*H02K 5/22* (2006.01)
*H02K 7/116* (2006.01)

(58) Field of Classification Search
CPC ...... H02K 7/1166; H02K 11/00; H02K 11/21; H02K 11/215
See application file for complete search history.

(56) References Cited

U.S. PATENT DOCUMENTS

| | | |
|---|---|---|
| 2004/0061391 A1 | 4/2004 | Matsuyama et al. |
| 2014/0187097 A1* | 7/2014 | Yokoyama ........... H01R 12/725 439/660 |

FOREIGN PATENT DOCUMENTS

| | | |
|---|---|---|
| JP | 05115148 | 5/1993 |
| JP | 11215774 | 8/1999 |
| JP | 2002508920 A | 3/2002 |
| JP | 2004166481 | 6/2004 |
| JP | 4121108 B2 | 7/2008 |
| JP | 2008167052 | 7/2008 |
| JP | 2014130755 | 7/2014 |

OTHER PUBLICATIONS

Japanese International Search Report & Written Opinion (with English translation of Search Report), for PCT Patent Application No. PCT/2016/052169, dated Apr. 19, 2016, 10 pages.

\* cited by examiner

MOTOR APPARATUS

TECHNICAL FIELD

The present invention relates to a motor apparatus.

BACKGROUND ART

A motor apparatus is known which includes a motor equipped with a drive shaft, a sensor magnet configured to rotate integrally with the drive shaft, a housing including a sensor housing section in which the sensor magnet is located, and a pulse output board containing a Hall element adapted to detect rotation of the sensor magnet and output pulses. The Hall element is mounted on a mounting surface of a base of the pulse output board.

Patent Document 1 discloses a gear motor in which a Hall effect cell of a printed circuit board is positioned in the immediate vicinity of a magnetic disk, facing the magnetic disk without an intervening diaphragm or the like.

Also, Patent Document 2 discloses a small motor equipped with a speed reducer mechanism. On a pulse output board of the motor, a mounting surface of a Hall element is fixed to a sensor holder, being oriented in such a direction as to face a sensor magnet. Also, a diaphragm of a housing and a base plate of the sensor holder exist between the Hall element and the sensor magnet. Also, the sensor holder is provided with a locking claw used to fix the pulse output board and a locating lug used to position the pulse output board. Also, lead wires are connected to the Hall element by soldering or the like, thereby electrically connecting the pulse output board to a power window control circuit.

PRIOR ART DOCUMENT

Patent Document

Patent Document 1: National Publication of International Patent No. 2002-508920
Patent Document 2: Japanese Patent No. 4121108

SUMMARY OF THE INVENTION

Problems to be Solved by the Invention

According to Patent Document 1 above, the mounting surface of the Hall element faces the sensor magnet. Consequently, if grease supplied to a sliding portion in a neighborhood of the drive shaft scatters and attaches to the Hall element along with the rotation of the drive shaft, output accuracy of pulses outputted from the Hall element might degrade remarkably. Also, existence of any foreign metal object attached to the grease between the Hall element and the sensor magnet will incur further degradation of pulse output accuracy.

Furthermore, there is concern that a grease component attaching to the pulse output board may cause trouble, such as breakdown of a mold agent, corrosion, short circuits caused by foreign objects, on the pulse output board. Thus, as shown by Patent Document 2 above, a structure is conceivable which protects the Hall element from grease and the like by positioning the diaphragm of the housing and the base plate of the sensor holder between the Hall element and the sensor magnet. However, this complicates a housing structure, which might deteriorate productivity of the housing, and thus the motor.

Also, to ensure pulse output accuracy of the Hall element, it is necessary to increase positional accuracy of the pulse output board, and thus the Hall element, in relation to the sensor magnet. Thus, in Patent Document 2 above, strict management of dimensional accuracy is required with respect to the sensor holder used to position the pulse output board as well as to the locking claw and locating lug of the sensor holder. Otherwise, the productivity of the housing, and thus the motor, might be further deteriorated.

Also, in Patent Document 2 above, the step of soldering the lead wires to the Hall element increases motor assembly man-hours, even making automation of the step difficult. Also, if a lead wire is pulled or the like, applying loads on a soldered spot, the lead wire may come off from the soldered spot, interrupting passage of electric current to the pulse output board, which might result in a failure to ensure quality of the motor.

A motor apparatus is disclosed herein which can improve the accuracy of detecting the rotation speed of the motor with a pulse output board using a simple housing structure and improve the motor quality and productivity.

Means for Solving the Problems

An aspect of the present invention is directed to providing a motor apparatus, comprising: a motor equipped with a drive shaft; a sensor magnet configured to rotate integrally with the drive shaft; a housing including a sensor housing section in which the sensor magnet is located; a pulse output board including a magnetically permeable base, and a rotation detection element mounted on a mounting surface of the base and adapted to detect rotation of the sensor magnet and output a pulse; and a terminal electrically connected with the pulse output board, wherein the terminal includes an insertion slot into which the pulse output board is inserted, and the insertion slot opens to the sensor housing section, and when the pulse output board is inserted, the insertion slot supports the pulse output board in a neighborhood of the sensor magnet with a reverse surface on a side opposite the mounting surface of the base facing the sensor magnet and electrically connects the pulse output board.

Preferably the terminal includes a contact terminal configured to form the insertion slot by pinching the mounting surface and the reverse surface of the pulse output board.

Preferably the contact terminal is made up of a moveable pin and a fixed pin; and the moveable pin is permitted to be displaced in a direction of being spaced away from the fixed pin to pinch the pulse output board between the moveable pin and the fixed pin by elastic deformation while the fixed pin is fixed to the housing to block displacement in a direction of being spaced away from the moveable pin.

Preferably the sensor housing section includes an insertion restricting portion adapted to define an insertion depth of the pulse output board into the insertion slot.

Preferably the terminal includes a plurality of terminals; and a plurality of contact portions is formed on the pulse output board, the plurality of contact portions being brought into contact with the contact terminals of respective ones of the plurality of terminals when the pulse output board is inserted into the insertion slot.

Preferably the pulse output board includes a front end face with which insertion of the pulse output board into the insertion slot is started; and the front end face includes a stepped portion configured to protrude the front end face stepwise in an insertion direction of the pulse output board.

Preferably the moveable pins of the plurality of terminals have respective abutting portions with respect to the pulse output board at different positions in the insertion direction of the pulse output board.

Advantageous Effects

The motor apparatus disclosed herein can improve the accuracy of detecting the rotation speed of the motor with a pulse output board using a simple housing structure and improve the motor quality and productivity.

DETAILED DESCRIPTION

An embodiment of the present invention will be described below with reference to the drawings.

Figure 1:
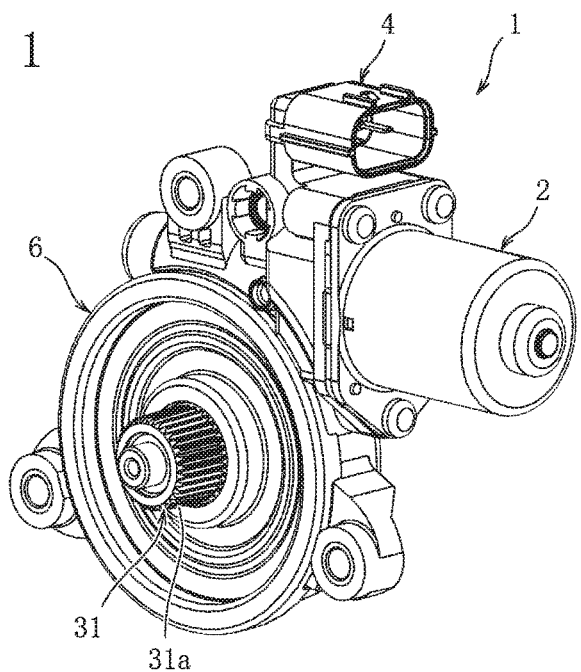
FIG. 1 is a perspective view of a motor apparatus according to an embodiment of the present invention.

FIG. 1 is a perspective view of a motor apparatus 1 according to an embodiment of the present invention. As shown in FIG. 1, the motor apparatus 1 includes a motor 2, a power supply connector 4, and a gear unit 6. The gear unit 6 is, for example, a speed reducer. The motor apparatus 1, which is a DC motor apparatus equipped with a water-proof gear unit, is used to drive automotive electrical equipment, including power windows adapted to automatically open and close windowpanes of an automobile, an electric sunroof mounted on a ceiling of a vehicle body, and electric slide doors.

Figure 2:
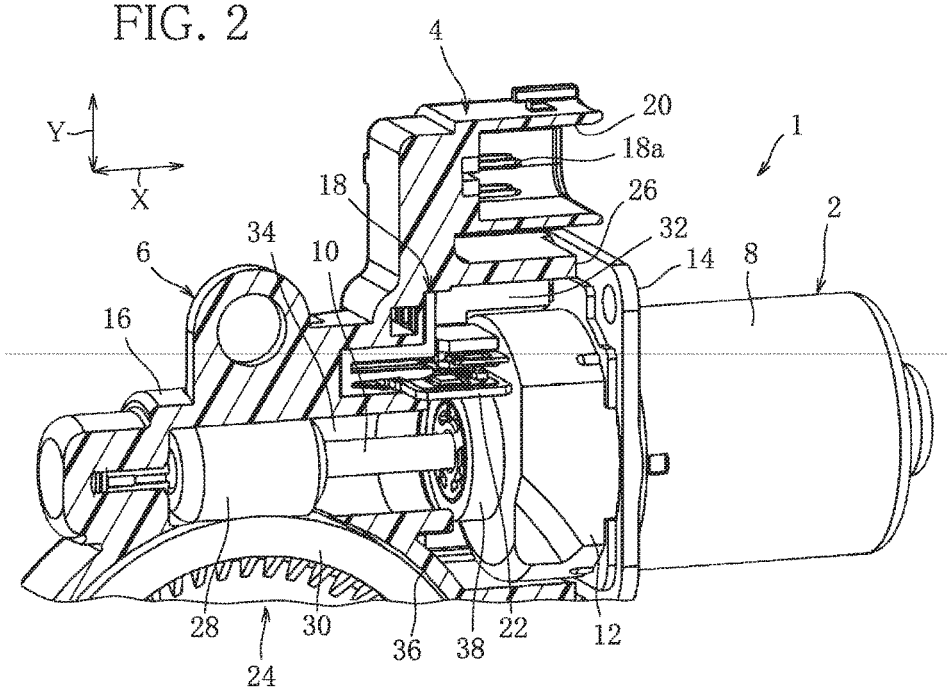
FIG. 2 is a partial perspective view of the motor apparatus, showing part of a gear unit of FIG. 1 in section.

FIG. 2 is a partial perspective view of the motor apparatus 1, showing part of the gear unit 6 of FIG. 1 in section. As shown in FIG. 2, the motor 2 includes a motor case 8, a drive shaft 10, and an end bell cap 12. The motor case 8 includes a motor case open end 14 provided with a flange. The drive shaft 10 and end bell cap 12 pass through a non-illustrated completed rotor and the motor case open end 14 and protrudes from the motor case 8.

The end bell cap 12 is made up of an end bell, a brush holder, a brush, a terminal (none is illustrated), and the like. The power supply connector 4 is resin-molded integrally with a gear housing (housing) 16 described later and includes a plurality of terminals 18 and a connector mount 20 of a bottomed cylindrical shape.

The terminals 18 are made of metal and, for example, four terminals 18 are insert-molded in the gear housing 16 and respective connection terminals 18a of the terminals 18 protrude from a bottom of the connector mount 20 toward the motor 2 along an axial direction X of the drive shaft 10. By mounting a non-illustrated external connector on the connector mount 20, it is possible to pass electric current to the terminals 18, and thus a pulse output board 22 described later, from the connection terminals 18a.

The gear unit 6 includes the gear housing 16 and a gear train 24 housed in the gear housing 16. The gear housing 16 includes a gear housing open end 26. The drive shaft 10 extends from the motor 2 toward the gear unit 6 and the flange of the motor case open end 14 is bolt-connected to the gear housing open end 26 in the axial direction X. The gear train 24 is made up of a worm 28 fixed to the drive shaft 10 and a worm wheel 30 meshed with the worm 28.

As shown in FIG. 1, the worm wheel 30 includes an output shaft 31 erected in a center of a main body of the wheel, and a gear portion 31a is formed on an outer circumference of a front end portion of the output shaft 31. The gear portion 31a is placed outside the motor apparatus 1 and meshed with a gear portion of a rotating member (e.g., a shaft of a cable drum) coupled to a non-illustrated driven device.

In this way, a rotational driving force of the motor 2 is transmitted from the drive shaft 10 to the rotating member, i.e., to an external driven device, by passing through the worm 28, the worm wheel 30, and the output shaft 31 in this order. Note that rotation of the worm wheel 30 may be transmitted to the output shaft 31 through non-illustrated cushioning rubber or the like.

As shown in FIG. 2, a sensor housing section 32, a shaft housing section 34, and a gear housing section 36 are formed as communicated space in the gear housing 16. The sensor housing section 32 is formed at a position adjacent to the power supply connector 4 in a radial direction Y (as viewed from a top and bottom direction in FIG. 2) of the drive shaft 10 and opens at the gear housing open end 26. The sensor housing section 32 houses the end bell cap 12, the pulse output board 22, a sensor magnet 38 described later, and the like, where the end bell cap 12 protrudes through the motor case open end 14.

The shaft housing section 34 extends from the sensor housing section 32 in a direction opposite the motor 2 along the axial direction X, has a shape smaller in diameter than the sensor housing section 32, and houses the drive shaft 10, the worm 28, and the like. The gear housing section 36 extends from the shaft housing section 34 in a direction opposite the power supply connector 4 along the radial direction Y and houses the worm wheel 30 and the like.

The sensor magnet 38 housed in the sensor housing section 32 has an annular shape, being fixed integrally rotatable to the drive shaft 10, and generates a magnetic flux while rotating integrally with the drive shaft 10. In a neighborhood of the sensor magnet 38 within the sensor housing section 32, the pulse output board 22 is positioned facing the sensor magnet 38 in the radial direction Y.

Figure 3:
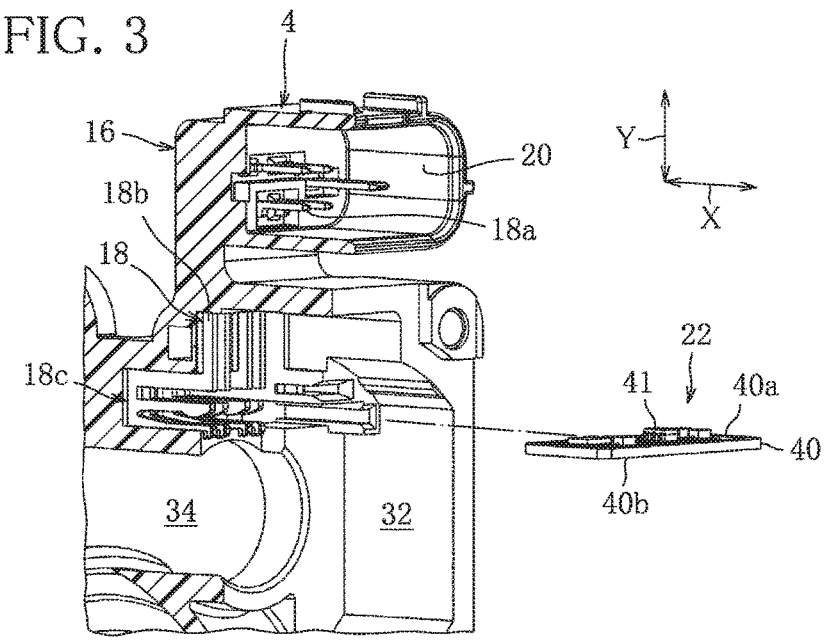
FIG. 3 is a partial perspective view, partially showing a gear housing in section before installation of a pulse output board of FIG. 2.
Figure 4:
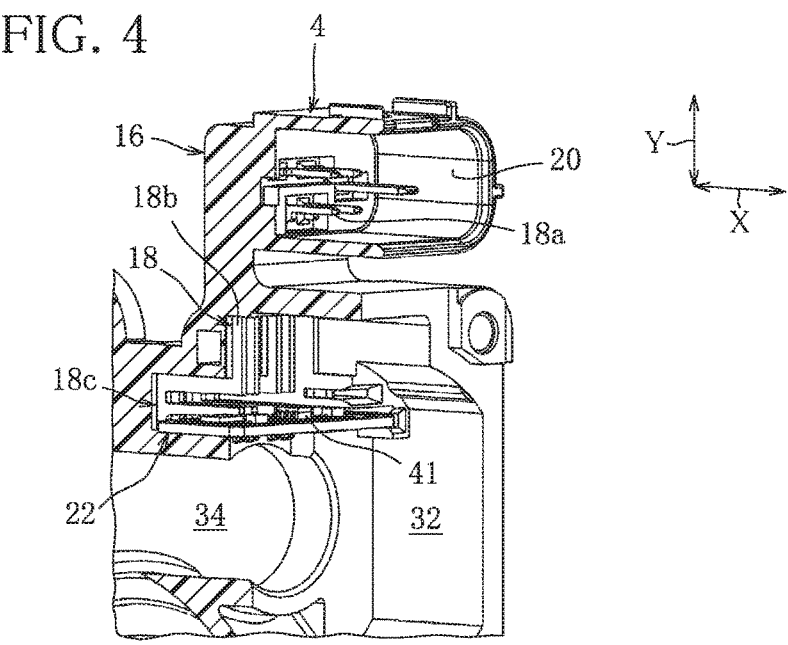
FIG. 4 is a perspective view after installation of the pulse output board in FIG. 3.

FIG. 3 is a partial perspective view, partially showing the gear housing 16 in section before installation of the pulse output board 22 while FIG. 4 is a perspective view after installation of the pulse output board 22 in FIG. 3. As shown in FIG. 3, the pulse output board 22 is a single-sided mounting board on which patterns, elements and the like are mounted only on one side and is equipped with a magnetically permeable base 40. Electronic chips such as a GMR element (rotation detection element) 41 and a non-illustrated capacitor and diode are mounted on a mounting surface 40*a* of the base 40, where the GMR element 41 detects rotation of the sensor magnet 38 based on the magnetic flux changes.

The GMR element 41—giant magnetoresistive element— is a semiconductor element which uses a giant magnetoresistive effect, in particular, out of magnetoresistive effects in which electric resistance of a material changes with a magnetic field, where relative changes of great magnitude occur in the giant magnetoresistive effect. The GMR element 41 outputs pulses based on detected rotation of the sensor magnet 38 to a non-illustrated rotation speed control unit of the motor 2. Each of the terminals 18 includes the connection terminal 18*a* described above, a vertical portion 18*b* bent in the radial direction Y from the connection terminal 18*a* and partially buried in the power supply connector 4, and an insertion slot 18*c* configured to open to the sensor housing section 32 and accept insertion of the pulse output board 22.

As shown in FIG. 4, when the pulse output board 22 is inserted, the insertion slot 18*c* supports the pulse output board 22 in the neighborhood of the sensor magnet 38 with a reverse surface 40*b* on a side opposite the mounting surface 40*a* of the base 40 facing the sensor magnet 38 (see FIG. 2) and electrically connects the pulse output board 22, thereby enabling passage of electric current to the pulse output board 22.

Figure 5:
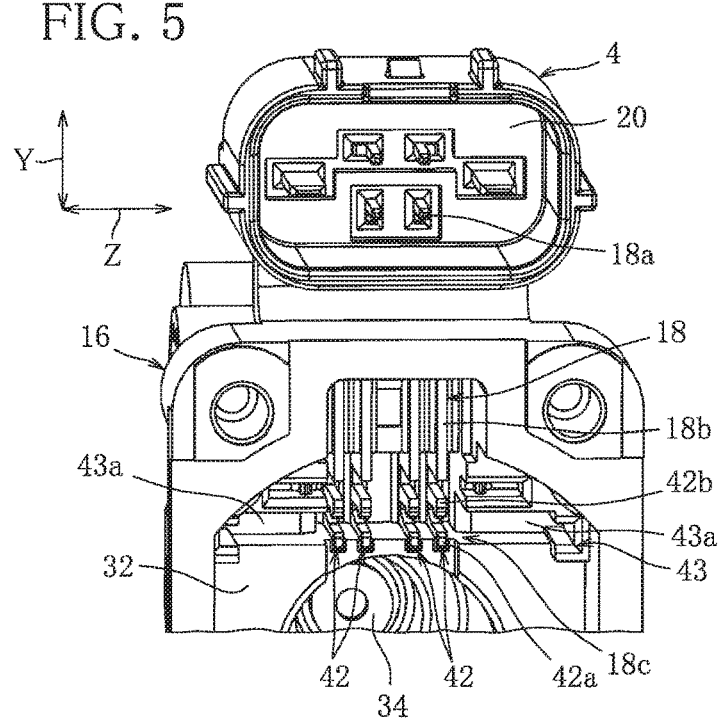
FIG. 5 is a partial perspective view, showing the gear housing as viewed from the side of a gear housing open end before installation of the pulse output board of FIG. 2.
Figure 6:
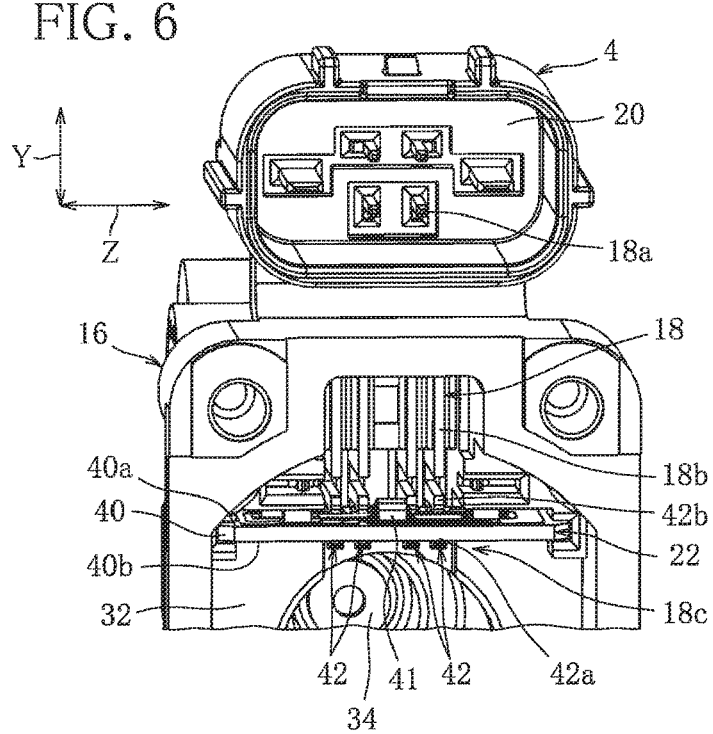
FIG. 6 is a perspective view after installation of the pulse output board in FIG. 5.

FIG. 5 is a partial perspective view, showing the gear housing 16 as viewed from the side of the gear housing open end 26 before installation of the pulse output board 22 while FIG. 6 is a perspective view after installation of the pulse output board 22 in FIG. 5. As shown in FIGS. 5 and 6, each of the terminals 18 has a contact terminal 42, and four contact terminals 42 of the respective terminals 18 are arranged in the radial direction Z (as viewed in a left and right direction in FIGS. 5 and 6) of the drive shaft 10 to pinch the mounting surface 40*a* of the pulse output board 22 and the reverse surface 40*b*, thereby forming the insertion slot 18*c*.

As shown in FIG. 5, in the gear housing 16, a board guide groove (insertion restricting portion) 43 is formed on a side face of the sensor housing section 32. When inserted into the board guide groove 43, the pulse output board 22 is housed in the sensor housing section 32. A butting portion 43*a* is formed in the board guide groove 43 to limit insertion depth of the pulse output board 22 into the insertion slot 18*c* when the pulse output board 22 is inserted into the board guide groove 43. That is, the insertion depth of the pulse output board 22 into the insertion slot 18*c* is defined by position of the butting portion 43*a* in the board guide groove 43.

Figure 7:
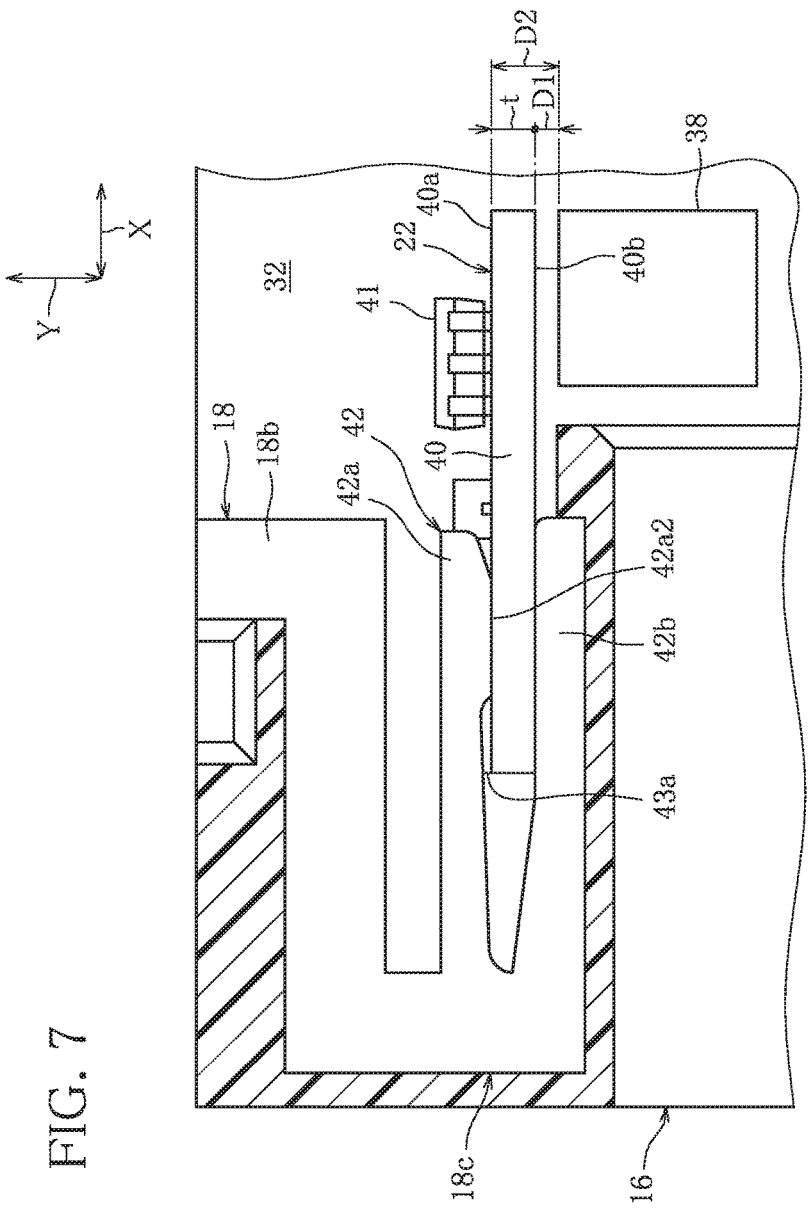
FIG. 7 is a side view showing the pulse output board of FIG. 2 in enlargement.

FIG. 7 is a side view showing the pulse output board 22 of FIG. 2 in enlargement. As also shown in FIG. 7, each contact terminal 42 has a clip shape made up of a moveable pin 42*a* located on an upper side when viewed in FIG. 7 and a fixed pin 42*b* located on a lower side when viewed in FIG. 7. The moveable pin 42*a*, which abuts the mounting surface 40*a*, is permitted to be displaced in a direction of being spaced away from the fixed pin 42*b* when pinching the pulse output board 22 in conjunction with the fixed pin 42*b* by elastic deformation. On the other hand, the fixed pin 42*b*, which abuts the reverse surface 40*b*, is fixed to the gear housing 16 by being partially buried in the gear housing 16 to block displacement in a direction of being spaced away from the moveable pin 42*a*.

Also, an abutting portion 42*a*2 with respect to the pulse output board 22 is formed on each moveable pin 42*a* and the abutting portion 42*a*2 is arc-shaped when viewed in FIG. 7. This reduces contact area of the moveable pin 42*a* with respect to the pulse output board 22, making it possible to increase a pressing force of the moveable pin 42*a* with respect to the mounting surface 40*a*, and thereby allows the clip-shaped contact terminal 42 to securely pinch the pulse output board 22.

Figure 8:
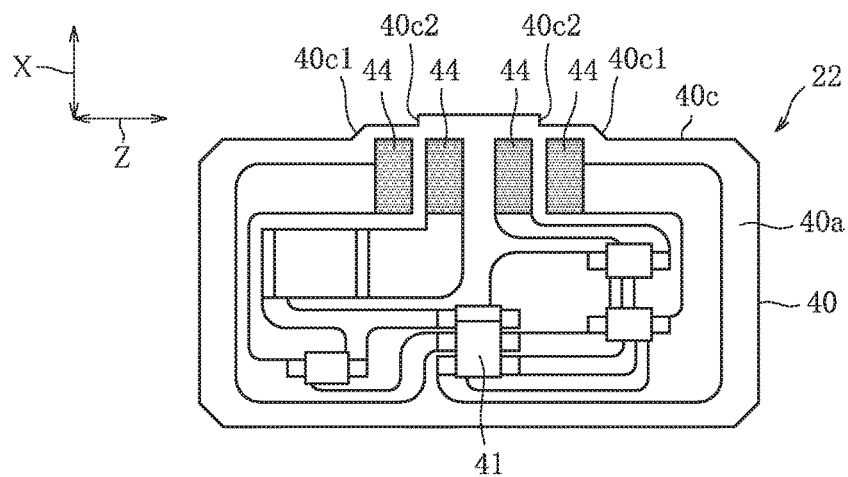
FIG. 8 is a plan view of the pulse output board of FIG. 2 as viewed from a mounting surface side of the pulse output board.

FIG. 8 is a plan view of the pulse output board 22 as viewed from the side of the mounting surface 40*a* of the pulse output board 22. As shown in FIG. 8, four electrode portions (contact portions) 44 which is brought into contact with the moveable pins 42*a* of the respective contact terminals 42 during insertion of the pulse output board 22 into the insertion slot 18*c* are formed on the mounting surface 40*a* of the pulse output board 22. Also, the pulse output board 22 includes a front end face 40*c* with which the insertion of the pulse output board 22 into the insertion slot 18*c* is started and the front end face 40*c* has two stepped portions 40*c*1 and 40*c*2 each on both left and right sides to protrude the front end face 40*c* stepwise in an insertion direction of the pulse output board 22 (e.g., axial direction X).

As described above, according to the present embodiment, the terminals 18 form the insertion slot 18*c* into which the pulse output board 22 is inserted and when the pulse output board 22 is inserted into the insertion slot 18*c*, the insertion slot 18*c*, which opens to the sensor housing section 32, supports the pulse output board 22 in the neighborhood of the sensor magnet 38 with the reverse surface 40*b* on the side opposite the mounting surface 40*a* of the base 40 facing the sensor magnet 38 and electrically connects the pulse output board 22, thereby passing electric current to the pulse output board 22.

Consequently, grease and foreign metal objects scattering to the pulse output board 22 and thus to the GMR element 41 can be shielded by the base 40. Since the base 40 is formed of a magnetically permeable material, pulse output accuracy of the GMR element 41 is not affected. This eliminates the need to form a shield against grease and the like in the gear housing 16. Also, since the insertion slot 18*c* for the pulse output board 22 is formed by the terminals 18, there is no need to form parts such as a sensor holder used to fix and position the pulse output board 22, a locking claw of the sensor holder, and a locating lug in the gear housing 16.

Also, since it is possible to supply power to the pulse output board 22 and output pulses to the outside from the GMR element 41 and the like mounted on the pulse output board 22 by simply inserting the pulse output board 22 into the insertion slot 18*c*, a step of soldering lead wires to the output board 22 can be slashed and the insertion of the pulse output board 22 into the insertion slot 18*c* can be automated easily. Thus, it is possible to improve the accuracy of detecting the rotation speed of the motor 2 with the pulse output board 22 using a simple structure of the gear housing 16 and improve quality and productivity of the motor 2.

More specifically, by pinching the mounting surface 40*a* and reverse surface 40*b* of the pulse output board 22 with the contact terminals 42 of the terminals 18, the insertion slot 18*c* enables positioning of, and passage of electric current to, the pulse output board 22 simultaneously. The pulse output board 22 is pinched by the contact terminals 42 using the moveable pins 42*a* placed in contact with the mounting surface 40*a* and the fixed pins 42*b* placed in contact with the reverse surface 40*b*. When pinching the pulse output board 22 in conjunction with the fixed pins 42*b* by elastic deformation, the moveable pins 42*a* are permitted to be displaced in a direction of being spaced away from the fixed pins 42*b*, thereby permitting the pulse output board 22 to be inserted into the insertion slot 18*c*.

On the other hand, the fixed pins 42*b* are fixed to the gear housing 16 to block displacement in the direction of being spaced away from the moveable pins 42*a*. Consequently, a distance D1 between the reverse surface 40*b* and the sensor magnet 38 becomes constant as shown in FIG. 7. Because thickness t of the pulse output board 22 is constant, a distance D2, which is a total of the distance D1 and thickness t, is constant and is maintained as a spacing distance between the GMR element 41 and the sensor magnet 38.

Also, the board guide groove 43 can define the insertion depth of the pulse output board 22 into the insertion slot 18*c*. This prevents the pulse output board 22 from being pushed too far into the insertion slot 18*c*, changing the distance D2 and thereby prevents the pulse output accuracy and thus the accuracy of detecting the rotation speed of the motor 2 from degrading.

Also, since the stepped portions 40*c*1 and 40*c*2 are formed on the front end face 40*c* of the pulse output board 22, when the pulse output board 22 is inserted into the insertion slot 18*c*, each contact terminal 42 is brought stepwise into contact with the respective electrode portion 44 and that part of the base 40 which is located ahead of the respective electrode portion 44. Consequently, insertion loads on the pulse output board 22 are temporally scattered, making it possible to prevent the pulse output board 22 from being cracked and broken when inserted into the insertion slot 18*c*.

The present invention is not limited to the embodiment described above, and various modifications are possible.

For example, whereas in the embodiment described above, the insertion slot 18*c* is formed by the four contact terminals 42 of the respective terminals 18, the number of the terminals 18 and thus the contact terminals 42 is not limited, and aspects of the insertion slot 18*c* are not limited to those formed by clip-shaped contact terminals 42.

Also, whereas in the embodiment described above, the GMR element 41 is used to detect the rotation speed of the sensor magnet 38, another magnetic sensor (e.g., Hall element) may be used instead of the GMR element 41.

Also, in the embodiment described above, the pulse output board 22 is a single-sided mounting board on which patterns, the GMR element 41, and other electronic chips are all mounted only on one side, namely on the mounting surface 40*a*. However, this is not restrictive, and the pulse output board 22 may have any specification as long as at least the GMR element 41 is mounted on the mounting surface 40*a*, and electronic chips other than patterns and the GMR element 41 may exist on the reverse surface 40*b* on the side opposite the mounting surface 40*a*.

Figure 9:
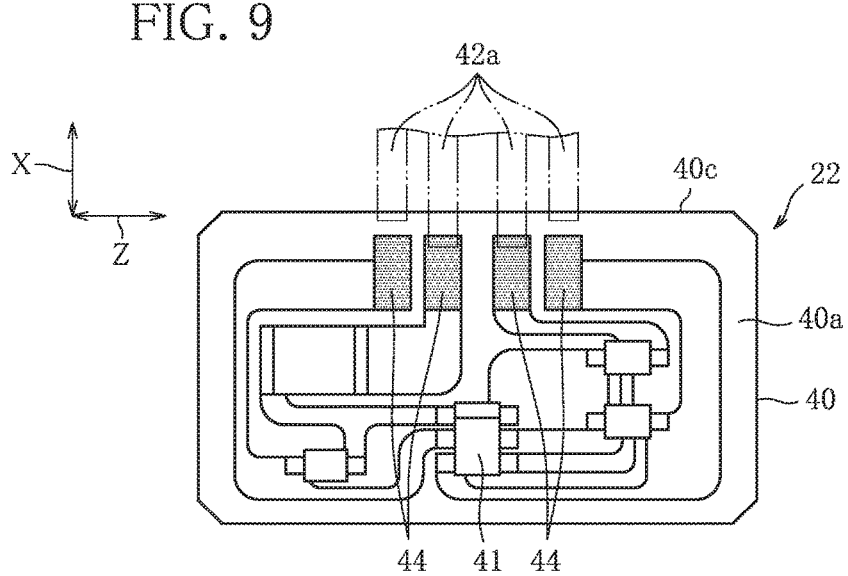
FIG. 9 is a plan view of a variation of an abutting state of the pulse output board and terminals of FIG. 7 as viewed from a mounting surface side of the pulse output board.

Also, in the embodiment described above, the stepped portions 40*c*1 and 40*c*2 are installed on the front end face 40*c* of the pulse output board 22. However, this is not restrictive, and instead of installing the stepped portions 40*c*1 and 40*c*2 on the front end face 40*c* of the pulse output board 22, the abutting portions 42*a*2 may be caused to abut different positions of the pulse output board 22 stepwise in the insertion direction of the pulse output board 22 by changing length of the moveable pin 42*a* of each contact terminal 42 as shown in FIG. 9. In this case again, as when the stepped portions 40*c*1 and 40*c*2 are provided, insertion loads of the contact terminals 42 on the pulse output board 22 are temporally scattered, making it possible to prevent the pulse output board 22 from being cracked or otherwise broken.

EXPLANATION OF REFERENCE SIGNS

1 Motor apparatus
2 Motor
10 Drive shaft
16 Gear housing (housing)
18 Terminal
18*c* Insertion slot
22 Pulse output board
32 Sensor housing section
38 Sensor magnet
40 Base
40*a* Mounting surface
40*b* Reverse surface
40*c* Front end face
40*c*1, 40*c*2 Stepped portion
41 GMR element (rotation detection element)
42 Contact terminal
42*a* Moveable pin
42*b* Fixed pin
43 Board guide groove (insertion restricting portion)
42*a*2 Abutting portion
44 Electrode portion (contact portion)

The invention claimed is:

1. A motor apparatus, comprising:
a motor equipped with a drive shaft;
a sensor magnet configured to rotate integrally with the drive shaft;
a housing including a sensor housing section in which the sensor magnet is located;
a pulse output board including a magnetically permeable base, and a rotation detection element mounted on a mounting surface of the base and adapted to detect rotation of the sensor magnet and output a pulse; and
a terminal electrically connected with the pulse output board,
wherein the terminal includes an insertion slot into which the pulse output board is inserted,
wherein the insertion slot opens to the sensor housing section, such that when the pulse output board is inserted, the insertion slot supports the pulse output board with a reverse surface on a side opposite the mounting surface of the base facing the sensor magnet, and electrically connects the pulse output board,
wherein the terminal includes a contact terminal configured to form the insertion slot by pinching the mounting surface and the reverse surface of the pulse output board,
wherein:
the contact terminal is made up of a moveable pin and a fixed pin; and
the moveable pin is permitted to be displaced in a direction of being spaced away from the fixed pin to pinch the pulse output board between the moveable pin and the fixed pin by elastic deformation while the fixed pin is fixed to the housing to block displacement in a direction of being spaced away from the moveable pin, and
wherein the sensor housing section includes an insertion restricting portion configured to define an insertion depth of the pulse output board into the insertion slot.

2. A motor apparatus comprising:
a motor equipped with a drive shaft;
a sensor magnet configured to rotate integrally with the drive shaft;
a housing including a sensor housing section in which the sensor magnet is located;
a pulse output board including a magnetically permeable base, and a rotation detection element mounted on a mounting surface of the base and adapted to detect rotation of the sensor magnet and output a pulse; and
a terminal electrically connected with the pulse output board, wherein the terminal includes an insertion slot into which the pulse output board is inserted, wherein the insertion slot opens to the sensor housing section, such that when the pulse output board is inserted, the insertion slot supports the pulse output board with a reverse surface on a side opposite the mounting surface of the base facing the sensor magnet, and electrically connects the pulse output board, wherein the terminal includes a contact terminal configured to form the insertion slot by pinching the mounting surface and the reverse surface of the pulse output board, wherein:
the contact terminal is made up of a moveable pin and a fixed pin; and
the moveable pin is permitted to be displaced in a direction of being spaced away from the fixed pin to pinch the pulse output board between the moveable pin and the fixed pin by elastic deformation while the fixed pin is fixed to the housing to block displacement in a direction of being spaced away from the moveable pin, and wherein:
the terminal comprises a plurality of terminals; and
a plurality of contact portions is formed on the pulse output board, the plurality of contact portions being brought into contact with the contact terminals of respective ones of the plurality of terminals when the pulse output board is inserted into the insertion slot.

3. The motor apparatus according to claim 2, wherein:
the pulse output board includes a front end face with which insertion of the pulse output board into the insertion slot is started; and
the front end face includes a stepped portion configured to protrude the front end face stepwise in an insertion direction of the pulse output board.

4. The motor apparatus according to claim 2, wherein:
the moveable pins of the plurality of terminals have respective abutting portions with respect to the pulse output board at different positions in the insertion direction of the pulse output board.

5. The motor apparatus according to claim 1, wherein:
the terminal comprises a plurality of terminals; and
a plurality of contact portions is formed on the pulse output board, the plurality of contact portions being brought into contact with the contact terminals of respective ones of the plurality of terminals when the pulse output board is inserted into the insertion slot.

6. The motor apparatus according to claim 5, wherein:
the pulse output board includes a front end face with which insertion of the pulse output board into the insertion slot is started; and
the front end face includes a stepped portion configured to protrude the front end face stepwise in an insertion direction of the pulse output board.

7. The motor apparatus according to claim 5, wherein:
the moveable pins of the plurality of terminals have respective abutting portions with respect to the pulse output board at different positions in the insertion direction of the pulse output board.

* * * * *